UNITED STATES PATENT OFFICE.

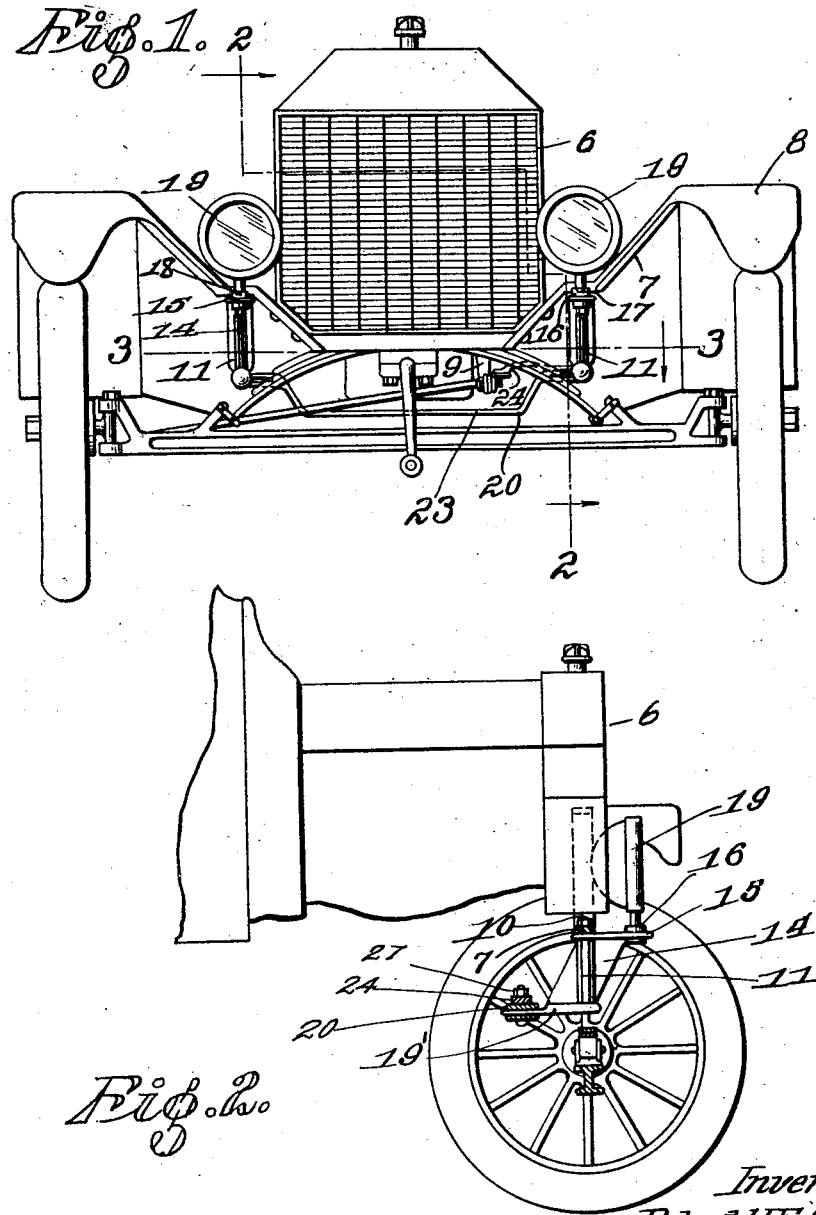

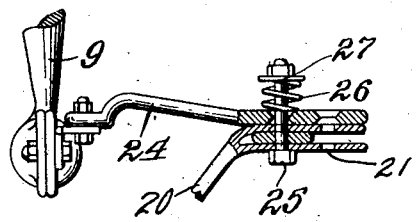
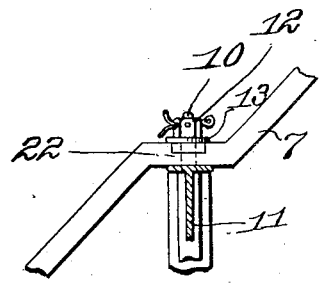
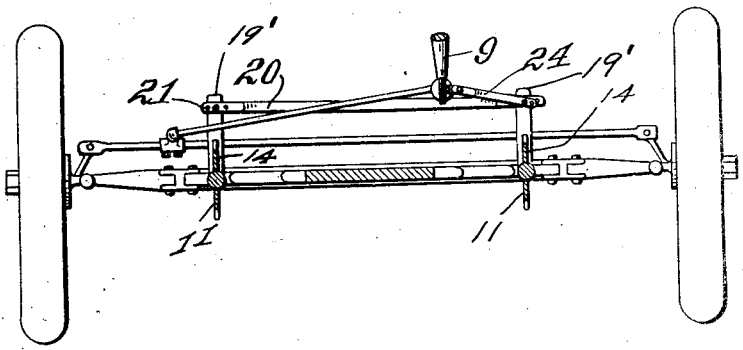

ROBERT H. E. SCHLECHT, OF ST. LOUIS, MISSOURI.

SWIVELING HEADLIGHT FOR AUTOMOBILES.

1,409,122.  Specification of Letters Patent.  Patented Mar. 7, 1922.

Application filed September 22, 1919. Serial No. 325,305.

*To all whom it may concern:*

Be it known that I, ROBERT H. E. SCHLECHT, a citizen of the United States, and resident of St. Louis and State of Missouri, have invented certain new and useful Improvements in Swiveling Headlights for Automobiles, of which the following is a specification containing a full, clear, and exact description, reference being had to accompanying drawings, forming a part thereof.

My invention relates to swiveling supports for automobile head lights and has for its primary object a swiveling head light support which is attached to the brackets which support the fender of a Ford automobile.

A further object is to construct a swiveling support for head lights which is composed of only a few parts, namely the two head light supports and swiveling brackets, a lever by which these brackets are connected together, and a lever which connects the aforesaid mentioned parts to the steering gear which together with the connecting bolts, washers and nuts cheapens the cost of construction.

In the drawings,

Fig. 1 is a front elevation of an automobile with my device attached thereto.

Fig. 2 is a sectional view taken on the line 2—2 of Fig. 1, viewing the same in the direction of the arrows.

Fig. 3 is a sectional view taken on the line 3—3 of Fig. 1, viewing the same in the direction of the arrow.

Fig. 4 is a fragmental view with portions in section showing the manner in which the several parts are connected together, and also the connection to the steering gear.

Fig. 5 is a fragmental view of the lamp bracket with a portion thereof in section, and showing the manner of connecting the same to the fender supporting bracket.

In the construction of my device, I make use of the ordinary Ford machine 6, which is provided with brackets 7 supporting the fenders 8, and the ordinary steering mechanism 9. I will not describe these features in detail, as this construction is well known to the art, and to the public in general.

Through the bracket 7 extends a screw threaded lug 10, which is secured to the lamp supporting bracket 11, and swivelly mounted to the bracket 7 by means of a nut 12, and washer 13. This bracket 11 is provided with a downwardly projecting web 14. The upper portion of the web 14 is provided with a forwardly projecting horizontal portion 15, which is provided with a boss 16. This boss is slotted as indicated by the numeral 17, so as to receive the projecting tongue 18 formed on the lamp 19, this lamp being the same as is used on the Ford car; in fact it is only necessary to remove the Ford lamp from its present position on the bracket 7, and place it in position in the boss 16. The lower portion of the web 14 is provided with a rearwardly projecting horizontal portion 19′, and to this rearwardly extending portion is secured the connecting bar 20, this bar being provided with a plurality of perforations 21, so as to allow adjustment for any variation in distance between the openings 22 formed in the bracket 7, in which the head lights or lamps 19 are originally secured. The connecting rod 20 extends entirely across the front of the machine, and is bent or off-set as indicated by the numeral 23, so as to allow it to pass underneath the engine casing.

Secured to the steering gear 9 is a short connecting bar 24, which is connected to one of the brackets by means of a bolt 25. This connection is made to swivel readily by means of a spring 26 being interposed between the bar 24 and the nut and washer 27. This will prevent rattling, and at the same time allow a free swivel movement.

It will be seen by this construction that I make use of all the parts which originally come with an automobile, especially one built along the lines of the Ford, and add only four new principal parts, as previously pointed out; that is, the two lamp supporting brackets, and the two connecting rods, together with the necessary connecting parts such as bolts, nuts and washers, etc.

In this way a cheap device can be installed on the motor car, and all bevel gears or other expensive structure eliminated.

Another feature of my device is that the same can be installed or removed by any one possessing the ability to handle a wrench, as no mechanical skill is required to install the same.

Having fully described my invention what I claim is:

1. In swiveling headlights for automobiles, comprising in combination with the brackets supporting the fenders of an automobile, of a pair of brackets swivelly secured at their center to and beneath the first mentioned brackets, a web formed integral with each of said brackets, a horizontal forward extension formed on the upper portion of said web, a slotted boss formed integral with said horizontal portion and located at its outer end, a headlight rigidly secured in said boss, a horizontal rearward extension formed integral with said web and projecting beyond said web, a rod provided with a series of adjusting openings for connecting said rearward projections together and regulating the projection of said headlights, and a second rod for connecting one of said rearward projections to the steering post of an automobile.

2. In swiveling headlights for automobiles, comprising in combination with the brackets supporting the fenders of an automobile, of a pair of brackets swivelly secured at their center to and beneath the first mentioned brackets, a web formed integral with each of said brackets, a horizontal forward extension formed on the upper portion of said web, a slotted boss formed integral with said horizontal portion and located at its outer end, a headlight rigidly secured in said boss, a horizontal rearward extension formed integral with said web and projecting beyond said web, a rod provided with a series of adjusting openings for connecting said rearward projections together and regulating the projection of said headlights, a second rod for connecting one of said rearward projections to the steering post of an automobile, a bolt and nut for pivotally connecting said second rod to one of said rearward projections, and a coil spring mounted around said bolt and interposed between the second mentioned bar and nut, whereby said connection is made readily swivelly pivoted, and rattling is eliminated.

In testimony whereof, I have signed my name to this specification, in the presence of two subscribing witnesses.

ROBERT H. E. SCHLECHT.

Witnesses:
 EDWARD E. LONGAN,
 E. L. WALLACE.